(12) United States Patent
Sampath et al.

(10) Patent No.: US 8,755,363 B2
(45) Date of Patent: Jun. 17, 2014

(54) PHYSICAL LAYER SIGNALING OF CONTROL PARAMETERS

(75) Inventors: Hemanth Sampath, San Diego, CA (US); Didier Johannes Richard Van Nee, De Meern (NL); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 12/881,395

(22) Filed: Sep. 14, 2010

(65) Prior Publication Data

US 2011/0063991 A1 Mar. 17, 2011

Related U.S. Application Data

(60) Provisional application No. 61/242,563, filed on Sep. 15, 2009.

(51) Int. Cl.
*H04W 4/00* (2009.01)
*H04J 3/06* (2006.01)

(52) U.S. Cl.
USPC ............................ 370/338; 370/466; 370/509

(58) Field of Classification Search
USPC ................................. 370/338, 474, 466, 509
See application file for complete search history.

(56) References Cited

U.S. PATENT DOCUMENTS

| | | | |
|---|---|---|---|
| 2007/0002878 A1* | 1/2007 | Moorti et al. ................. | 370/401 |
| 2007/0097930 A1 | 5/2007 | Ouyang et al. | |
| 2007/0110055 A1* | 5/2007 | Fischer et al. ................. | 370/389 |
| 2007/0230600 A1* | 10/2007 | Bertrand et al. .............. | 375/260 |
| 2008/0240167 A1* | 10/2008 | Ivonnet et al. ................. | 370/515 |
| 2009/0116435 A1 | 5/2009 | Koorapaty et al. | |
| 2010/0309834 A1* | 12/2010 | Fischer et al. ................. | 370/312 |
| 2010/0309877 A1 | 12/2010 | Damnjanovic et al. | |
| 2011/0032875 A1* | 2/2011 | Erceg et al. .................... | 370/328 |

FOREIGN PATENT DOCUMENTS

| | | |
|---|---|---|
| EP | 1718095 A1 | 11/2006 |
| EP | 1729493 A1 | 12/2006 |
| JP | 2012523774 A | 10/2012 |
| RU | 2264050 C2 | 11/2005 |
| WO | WO-02071627 A2 | 9/2002 |
| WO | 2007087621 A2 | 8/2007 |
| WO | 2010120692 A1 | 10/2010 |

OTHER PUBLICATIONS

Gross J, et al., "Enhancing IEEE 802.11a/n with dynamic single-user OFDM adaptation", Performance Evaluation, Amsterdam, NL, vol. 66, No. 3-5, Mar. 1, 2009, pp. 240-257, XP025923721.
International Search Report and Written Opinion—PCT/US2010/048836, International Search Authority—European Patent Office—Feb. 17, 2011.
Lanante L, et al., "IEEE802.11ac Preamble with Legacy 802.11a/n Backward Compatibility", IEEE 802.11-YY/0847R0, [Online] Jul. 14, 2009, pp. 1-18, XP002606794, Retrieved from the Internet: URL:http://www.google.de/url''sa=t&source=web&cd=3 &ved=0CBgQFjAC&url=https%3A%2F%2Fmentor.ieee. org%2F802.11%2Fdcn%2F10%2F11-10-0791-02-00ac-pha se-rotation-for-the-80-mhz-802-11ac-mixed-mode-packet.ppt &ei=u3bFT07TE8qh4QbZko26Aw &usg=AFQjCNHYliVI8HNnsZmesHd33saVGqWpOw> [retrieved on Oct. 25, 2010].
Taiwan Search Report—TW099131271—TIPO—Jun. 11, 2013.

* cited by examiner

*Primary Examiner* — Andrew Lee
(74) *Attorney, Agent, or Firm* — Eric Ho

(57) ABSTRACT

Certain aspects of the present disclosure relate to a technique for signaling common user parameters in Very High Throughput (VHT) wireless systems.

28 Claims, 6 Drawing Sheets

PHYSICAL LAYER SIGNALING OF CONTROL PARAMETERS

CLAIM OF PRIORITY UNDER 35 U.S.C. §119

The present application for patent claims benefit of U.S. Provisional Patent Application Ser. No. 61/242,563, entitled, "Physical layer signaling of control parameters for VHT", filed Sep. 15, 2009, and assigned to the assignee hereof and hereby expressly incorporated by reference herein.

BACKGROUND

1. Field

Certain aspects of the present disclosure generally relate to wireless communications and, more particularly, to a method of signaling control parameters in Very High Throughput (VHT) wireless systems.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method for wireless communications. The method generally includes generating a preamble with at least one signal (SIG) field in a portion of the preamble associated with a first radio access technology, wherein the SIG fields comprise parameter bits indicating control information common to a plurality of apparatuses operating in accordance with a second radio access technology, and transmitting the preamble within a frame to the plurality of apparatuses.

Certain aspects of the present disclosure provide an apparatus for wireless communications. The apparatus generally includes a circuit configured to generate a preamble with at least one signal (SIG) field in a portion of the preamble associated with a first radio access technology, wherein the SIG fields comprise parameter bits indicating control information common to a plurality of other apparatuses operating in accordance with a second radio access technology, and a transmitter configured to transmit the preamble within a frame to the plurality of other apparatuses.

Certain aspects of the present disclosure provide an apparatus for wireless communications. The apparatus generally includes means for generating a preamble with at least one signal (SIG) field in a portion of the preamble associated with a first radio access technology, wherein the SIG fields comprise parameter bits indicating control information common to a plurality of other apparatuses operating in accordance with a second radio access technology, and means for transmitting the preamble within a frame to the plurality of other apparatuses.

Certain aspects provide a computer-program product for wireless communications. The computer-program product includes a computer-readable medium comprising instructions executable to generate a preamble with at least one signal (SIG) field in a portion of the preamble associated with a first radio access technology, wherein the SIG fields comprise parameter bits indicating control information common to a plurality of apparatuses operating in accordance with a second radio access technology, and transmit the preamble within a frame to the plurality of apparatuses.

Certain aspects provide an access point. The access point generally includes at least one antenna, a circuit configured to generate a preamble with at least one signal (SIG) field in a portion of the preamble associated with a first radio access technology, wherein the SIG fields comprise parameter bits indicating control information common to a plurality of wireless nodes operating in accordance with a second radio access technology, and a transmitter configured to transmit the preamble within a frame to the plurality of wireless nodes via the at least one antenna.

Certain aspects of the present disclosure provide a method for wireless communications. The method generally includes receiving a preamble within a frame, wherein a portion of the preamble associated with a first radio access technology comprises a plurality of parameter bits, detecting that the frame is related to a second radio access technology, and interpreting, based on the detection result, the parameter bits as control information common to a plurality of apparatuses operating in accordance with the second radio access technology.

Certain aspects of the present disclosure provide an apparatus for wireless communications. The apparatus generally includes a receiver configured to receive a preamble within a frame, wherein a portion of the preamble associated with a first radio access technology comprises a plurality of parameter bits, a detector configured to detect that the frame is related to a second radio access technology, and a circuit configured to interpret, based on the detection result, the parameter bits as control information common to a plurality of apparatuses operating in accordance with the second radio access technology.

Certain aspects of the present disclosure provide an apparatus for wireless communications. The apparatus generally includes means for receiving a preamble within a frame, wherein a portion of the preamble associated with a first radio access technology comprises a plurality of parameter bits, means for detecting that the frame is related to a second radio access technology, and means for interpreting, based on the detection result, the parameter bits as control information common to a plurality of apparatuses operating in accordance with the second radio access technology.

Certain aspects provide a computer-program product for wireless communications. The computer-program product includes a computer-readable medium comprising instructions executable to receive a preamble within a frame, wherein a portion of the preamble associated with a first radio access technology comprises a plurality of parameter bits, detect that the frame is related to a second radio access technology, and interpret, based on the detection result, the parameter bits as control information common to a plurality of apparatuses operating in accordance with the second radio access technology.

Certain aspects provide an access terminal. The access terminal generally includes at least one antenna, a receiver configured to receive a preamble within a frame via the at least one antenna, wherein a portion of the preamble associated with a first radio access technology comprises a plurality of parameter bits, a detector configured to detect that the frame is related to a second radio access technology, and a circuit configured to interpret, based on the detection result, the parameter bits as control information common to a plurality of access terminals operating in accordance with the second radio access technology.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
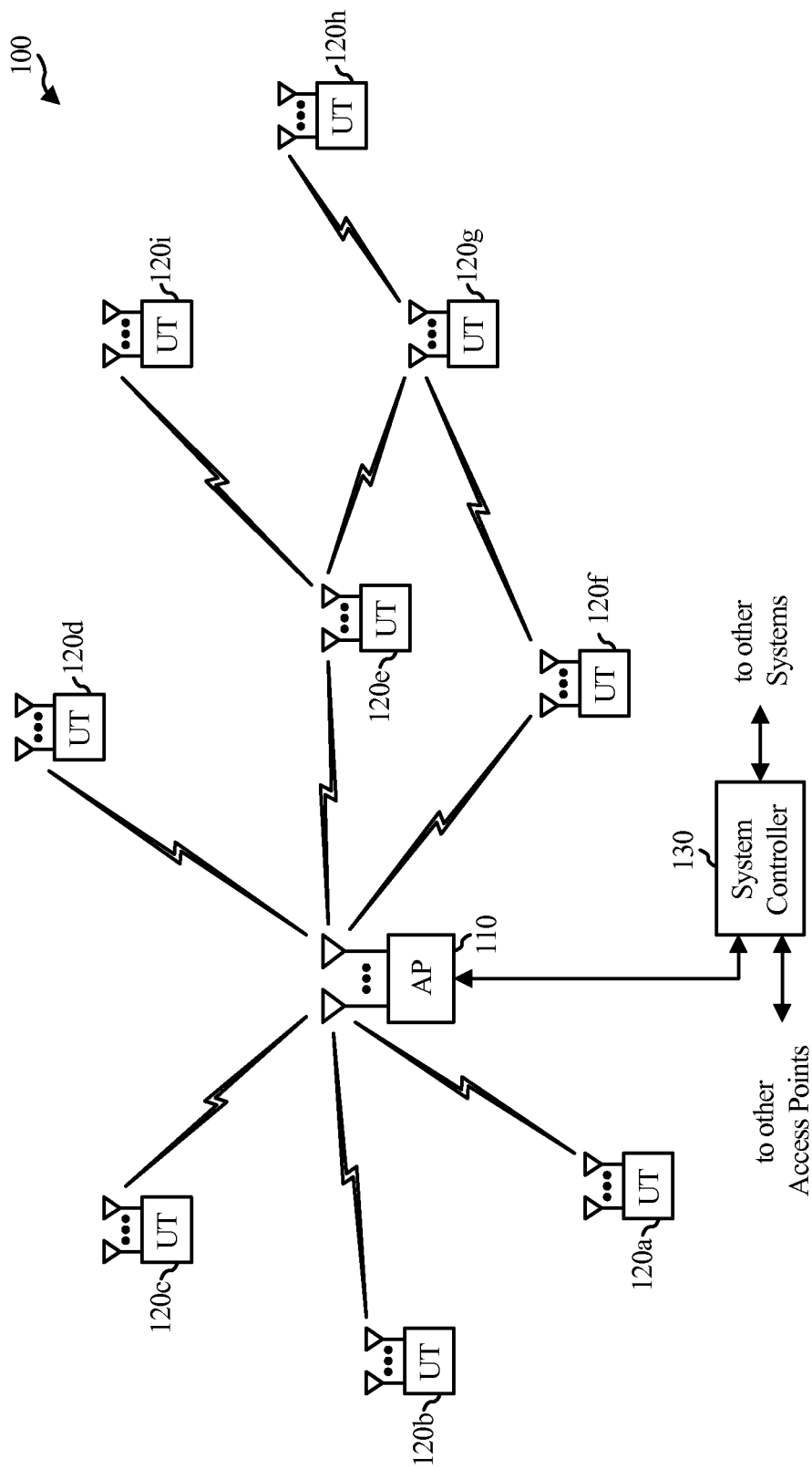
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
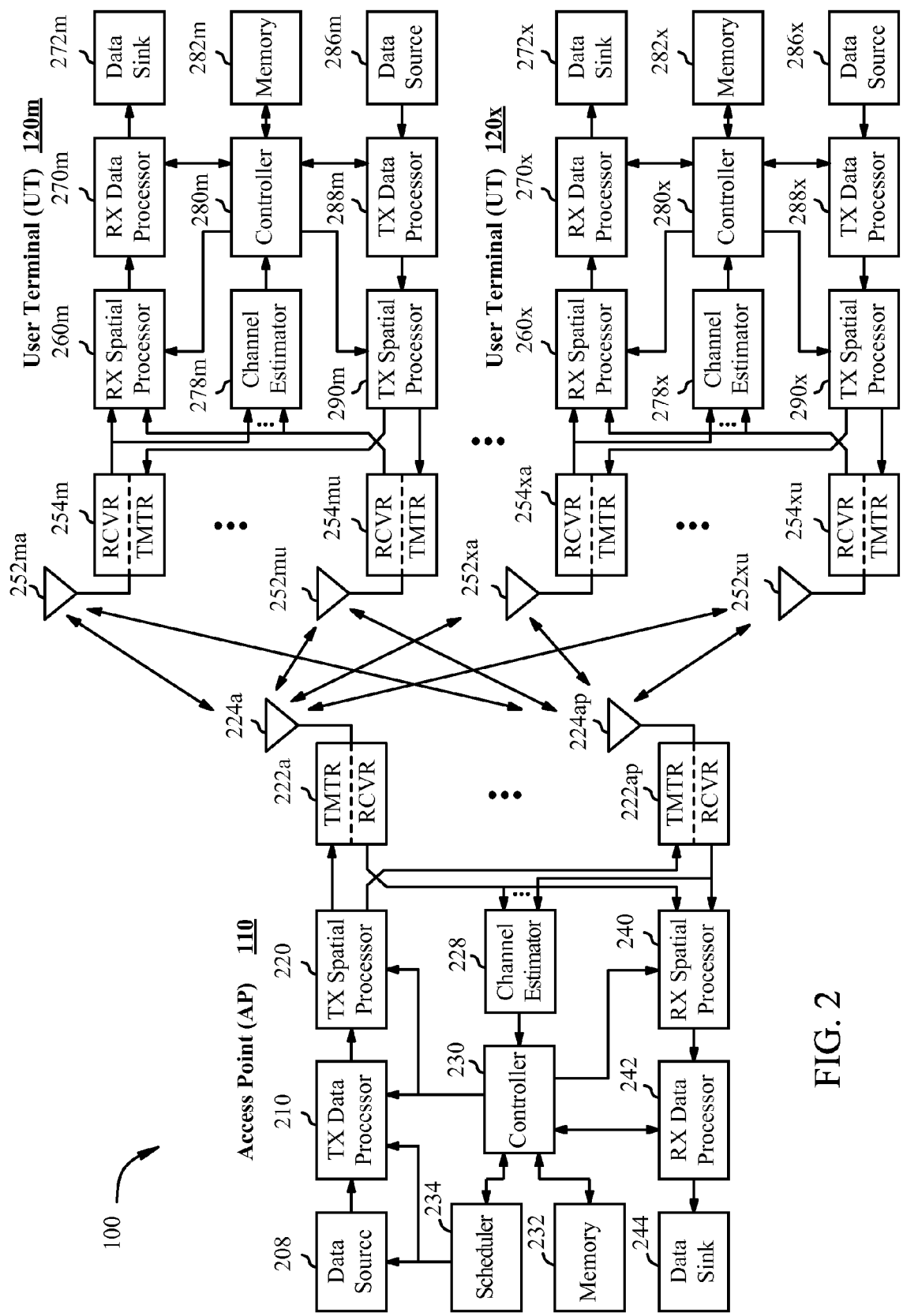
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with N, antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
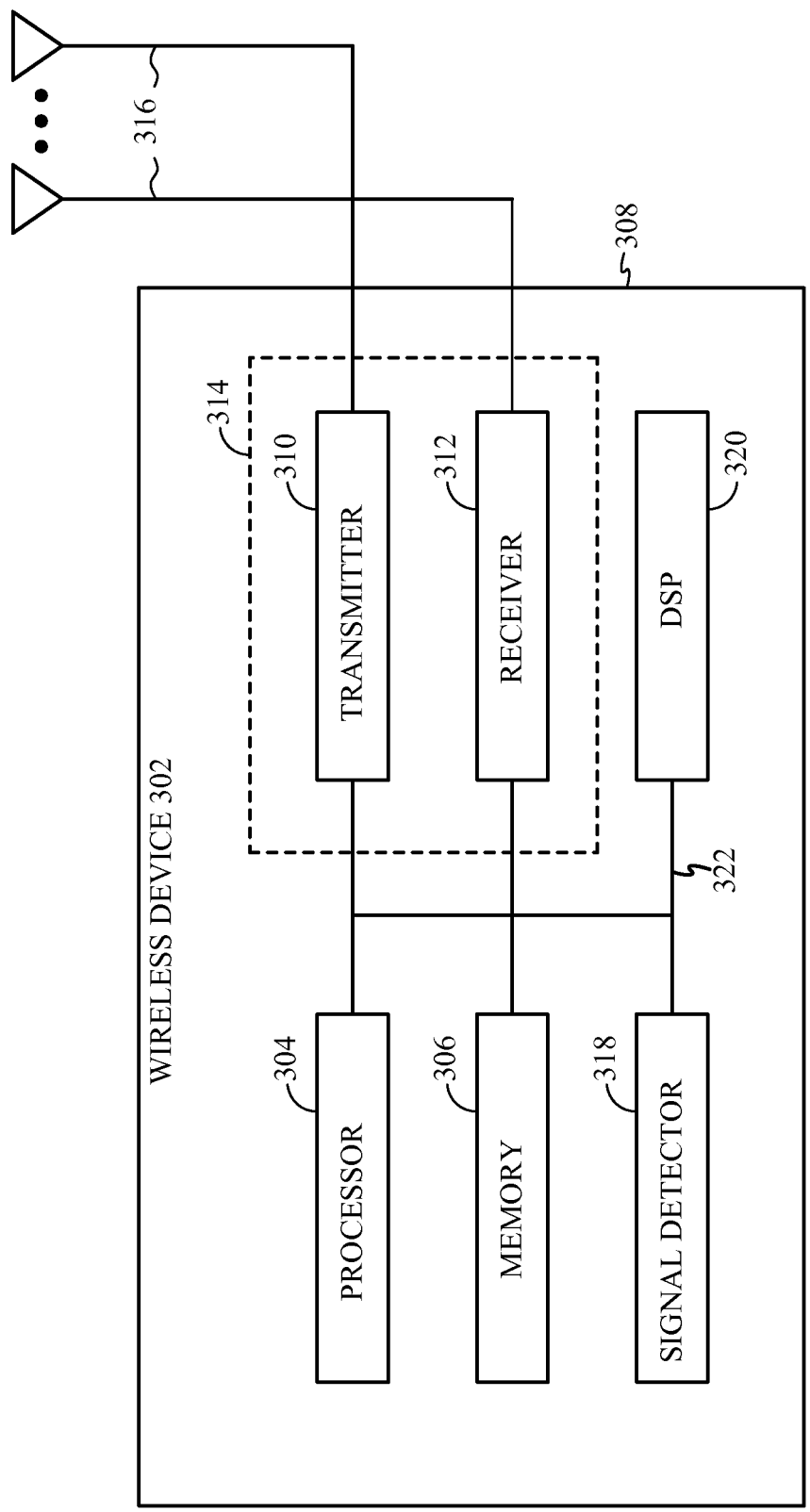
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Preamble Structure

Figure 4:
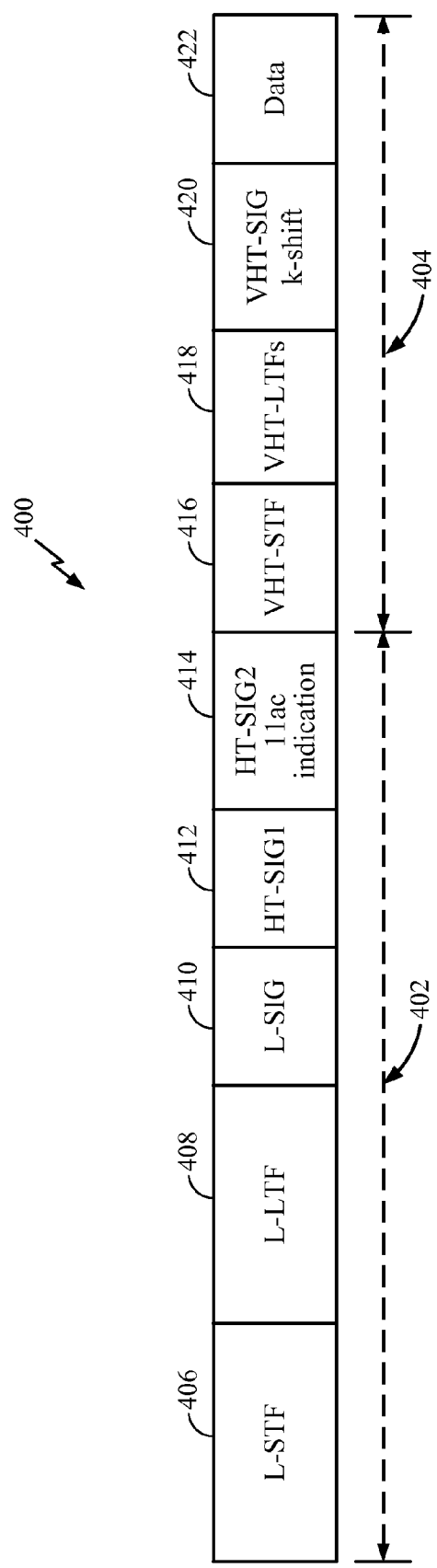
FIG. 4 illustrates an example structure of a preamble transmitted from an access point in accordance with certain aspects of the present disclosure.

FIG. 4 illustrates an example structure of a preamble 400 in accordance with certain aspects of the present disclosure. The preamble 400 may be transmitted, for example, from the access point 110 to the user stations 120 in the wireless network 100 illustrated in FIG. 1. Transmission of the preamble 400 in the wireless network 100 may be performed, for example, in accordance with a radio access technology based on IEEE 802.11n wireless communications standard, or alternatively in accordance with a radio access technology based on IEEE 802.11ac wireless communications standard.

The preamble 400 may comprise an omni-legacy portion 402 (i.e., a non-beamformed portion constructed in accordance with IEEE 802.11n wireless communications standard) and a precoded portion 404. The legacy portion 402 may comprise: a Legacy Short Training Field (L-STF) 406, a Legacy Long Training Field 408, a Legacy Signal (L-SIG) field 410, and two OFDM symbols 412-414 for High Throughput Signal fields (i.e., a HT-SIG1 field 412 and a HT-SIG2 field 414). The HT-SIG fields 412-414 may be transmitted omni-directionally and may indicate allocation of numbers of spatial streams to, for example, a subset of the user stations 120 from FIG. 1.

The precoded portion 404 may comprise: a Very High Throughput Short Training Field (VHT-STF) 416, Very High Throughput Long Training Fields (VHT-LTFs) 418, a Very High Throughput Signal (VHT-SIG) field 420, and a data portion 422. The VHT-SIG field may comprise one OFDM symbol and may be transmitted precoded/beamformed. Robust multi-user multiple-input multiple-output (MU-MIMO) reception may require that an access point transmits all VHT-LTFs 418 to all supported users. The VHT-LTFs 418 may allow each user to estimate a MIMO channel from all antennas of the access point to the user's antennas.

In IEEE 802.11n, physical layer signaling of control parameters may be accomplished using the HT-SIG fields 412-414. The HT-SIG1 field 412 may comprise parameters like: LENGTH (i.e., an indication of a frame length), Modulation-Coding Scheme (MCS) (i.e., an indication of MCS applied at the access point), and Bandwidth (BW) (e.g., an indication that utilized bandwidth is either 20 MHz of 40 MHz wide). A total of eight bits of the HT-SIG2 field 414 may comprise other parameters, such as: channel smoothing indication (1 bit), indication that no sounding is used (1 bit), aggregation (1 bit), coding (1 bit), short guard interval (1 bit), space-time block coding (STBC) (1 or 2 bits, and there may be three valid STBC options), and spatial streams (SS) (two bits). In addition, the HT-SIG2 field 414 may comprise an 8-bit CRC (Cyclic Redundancy Check) sum, six tail bits and one reserved bit. The HT-SIG1 and HT-SIG2 bits may be transmitted using, for example, rotated BPSK signaling.

In IEEE 802.11ac (i.e., Very High Throughput (VHT) wireless communications standard), physical layer signaling may be similarly accomplished by using a VHT-SIG field of a transmission preamble. Since the IEEE 802.11ac may be required to support MU-MIMO, the VHT-SIG field may be typically divided into two segments: VHT-SIG1 and VHT-SIG2. The purpose of VHT-SIG1 segment may be to enable early 802.11ac packet/mode detection and to transmit common information in an omni-directional fashion to all downlink (DL) MU-MIMO clients. The VHT-SIG1 segment may be transmitted instead of the HT-SIG1 and HT-SIG2 fields 412-414. The purpose of VHT-SIG2 segment may be to transmit per-client information (e.g., MCS) to each DL MU-MIMO client. It should be noted that the VHT-SIG2 may be precoded to each client—hence the VHT-SIG2 information may be different for different clients.

Signaling of Common Control Parameters in VHT Systems

The main problem with the aforementioned VHT-SIG1 signaling in IEEE 802.11ac systems is that receivers may not be able to distinguish whether VHT-SIG1 or HT-SIG1/HT-SIG2 fields were transmitted. In addition, the VHT-SIG1 field may lack a sufficient number of bits for signaling all common user information, without incurring additional overhead. It should be noted that there may be a significant number of parameters in IEEE 802.11ac that are common for multiple users, such as: multi-channel parameters, bandwidth parameters, channel training parameters, coding parameters, and so on.

802.11ac packet/mode detection may be enabled by utilizing (e.g., overlaying or using) an un-rotated BPSK code on the I-component of either the HT-SIG1 field 412 or the HT-SIG2 field 414 of the preamble 400 from FIG. 4. This may enable determining the presence of 802.11ac packet by the end of HT-SIG2 field 414, as indicated in FIG. 4. In an aspect of the present disclosure when an un-rotated BPSK code is overlaid on the HT-SIG2 field 414, five more bits of common user information may be signaled utilizing unused combinations of the LENGTH and MCS bits. The present disclosure also addresses an issue of how to signal additional common user information in IEEE 802.11ac systems.

In an aspect of the present disclosure when an un-rotated BPSK code is overlaid on the HT-SIG2 field 414, the aforementioned eight parameter bits within the HT-SIG2 field 414 may be used for signaling additional common control information to multiple users. The same eight parameter bits may be interpreted differently depending on whether a legacy packet (e.g., 802.11n packet or 802.11a packet) was transmitted or 802.11ac packet (frame) was transmitted.

An 802.11ac modem at a user station may be able to first detect the presence of the 802.11ac packet using the 802.11ac packet/mode detection enabled by the I-component of the HT-SIG1 field 412 or the HT-SIG2 field 414. If the 802.11ac packet is detected, then the 802.11ac modem may interpret the parameter bits within the HT-SIG1 and HT-SIG2 fields assuming 802.11ac packet transmission. In other words, the HT-SIG1 and HT-SIG2 fields may be interpreted as the VHT-SIG1 field. In an aspect of the present disclosure when an un-rotated BPSK code is overlaid on the HT-SIG2 field 414, the 802.11ac modem may also utilize the unused combinations of LENGTH and MCS bits (five bits in total) as control information for the 802.11ac packet. Therefore, the total of 13 bits may be used for signaling of the 802.11ac common user information.

On the other hand, if the 802.11ac packet is not detected, then the 802.11ac modem may assume that the packet (frame) which has been received may be a legacy packet (i.e., 802.11n packet or 802.11a packet), and the 802.11ac modem may interpret the eight parameter bits within the HT-SIG2 field assuming, for example, 802.11n packet transmission.

In an aspect of the present disclosure when an un-rotated BPSK code is overlaid on the HT-SIG2 field 414, the main advantage of the proposed method for signaling the 802.11ac common user information is that no additional overhead (in addition to the HT-SIG) may be required to signal VHT-SIG1 information. For this purpose, 13 bits of the 802.11n preamble (i.e., of the HT-SIG2 segment of a preamble) may be enabled for VHT-SIG1 common control signaling.

Figure 5:
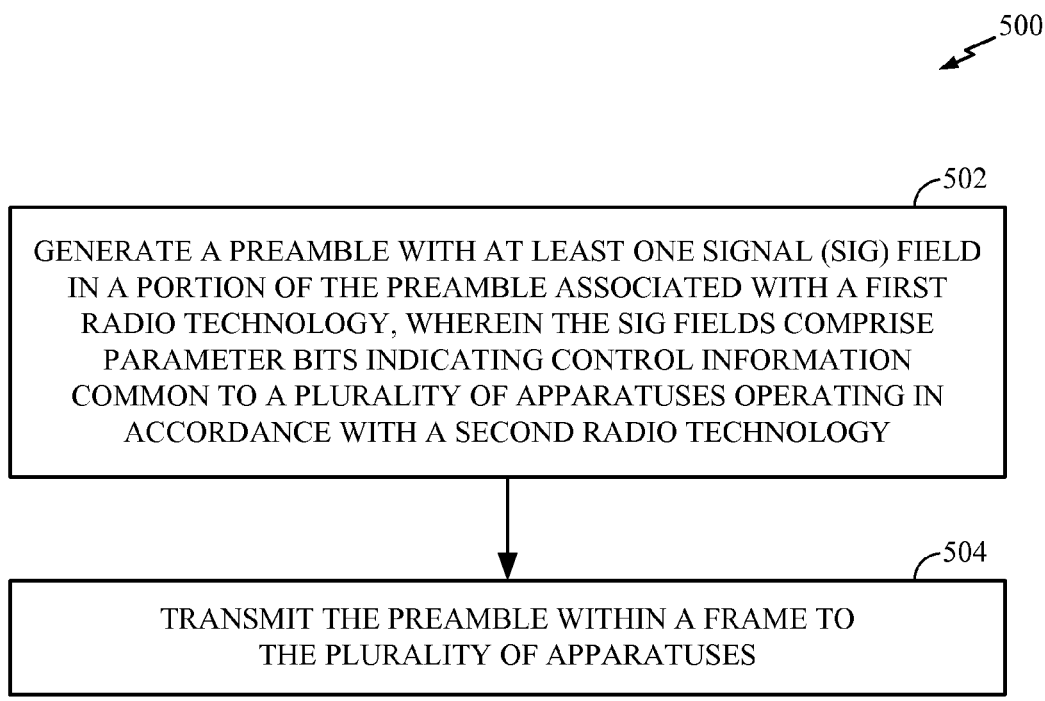
FIG. 5 illustrates example operations that may be performed at an access point in accordance with certain aspects of the present disclosure.

FIG. 5 illustrates example operations 500 that may be performed at an access point for signaling common user information in accordance with certain aspects of the present disclosure. At 502, the access point may generate a preamble with at least one signal (SIG) field in a portion of the preamble associated with a first radio access technology, wherein the SIG fields may comprise parameter bits indicating control information common to a plurality of apparatuses (users) operating in accordance with a second radio access technology. At 504, the access point may transmit the preamble within a frame (packet) to the plurality of apparatuses. As aforementioned, the parameter bits may comprise at least one of: combination of LENGTH and MCS bits, channel smoothing indication bit, sounding indication bit, aggregation bit, coding bit, short guard interval bit, STBC bit, or SS bits.

The frame may be transmitted in accordance with the first or the second radio access technology. The first radio access technology may comprise, for example, a technology based on IEEE 802.11n wireless communications standard, and the second radio access technology may comprise, for example, a technology based on IEEE 802.11ac wireless communications standard.

Figure 6:
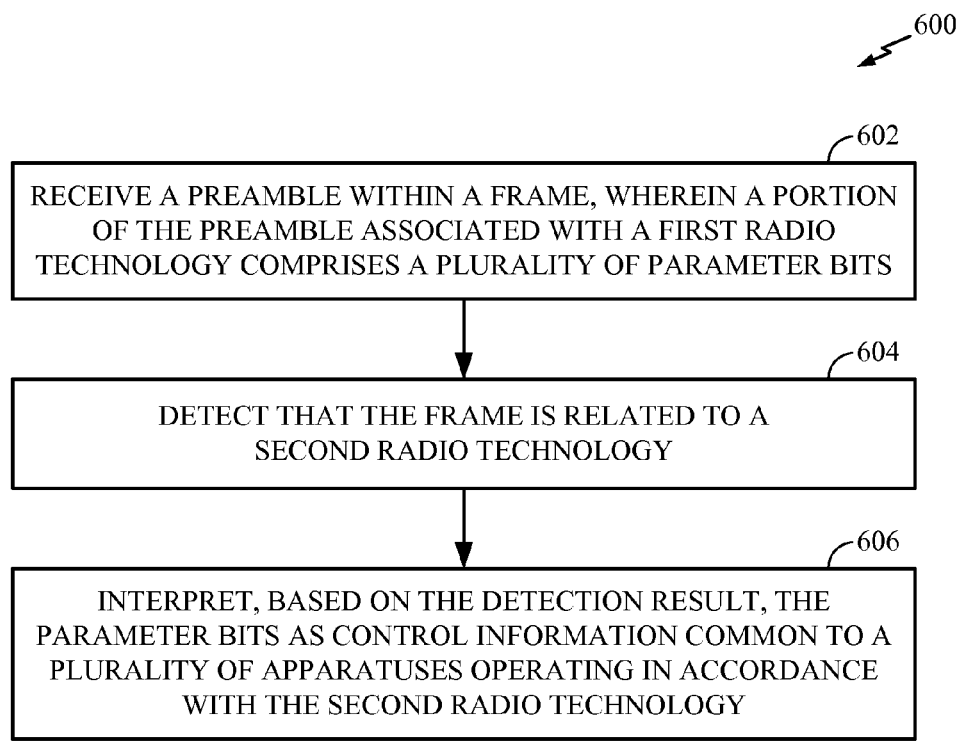
FIG. 6 illustrates example operations that may be performed at a user station in accordance with certain aspects of the present disclosure.

FIG. 6 illustrates example operations 600 that may be performed at a user station in accordance with certain aspects of the present disclosure. At 602, the user station may receive a preamble within a frame (packet), wherein a portion of the preamble associated with a first radio access technology may comprise at least one signal field with parameter bits. At 604, the user station may detect that the frame is related to a second radio access technology. At 606, the user station may interpret, based on the detection result, the parameter bits as control information common to a plurality of user stations operating in accordance with the second radio access technology.

In an aspect of the present disclosure, the user station may receive another preamble within another frame, wherein a portion of the other preamble associated with the first radio access technology may comprise another plurality of parameter bits. The user station may detect that the other frame is not related to the second radio access technology, and may interpret the other parameter bits according to assumption that the other frame may be related to the first radio access technology.

Figure 5A:
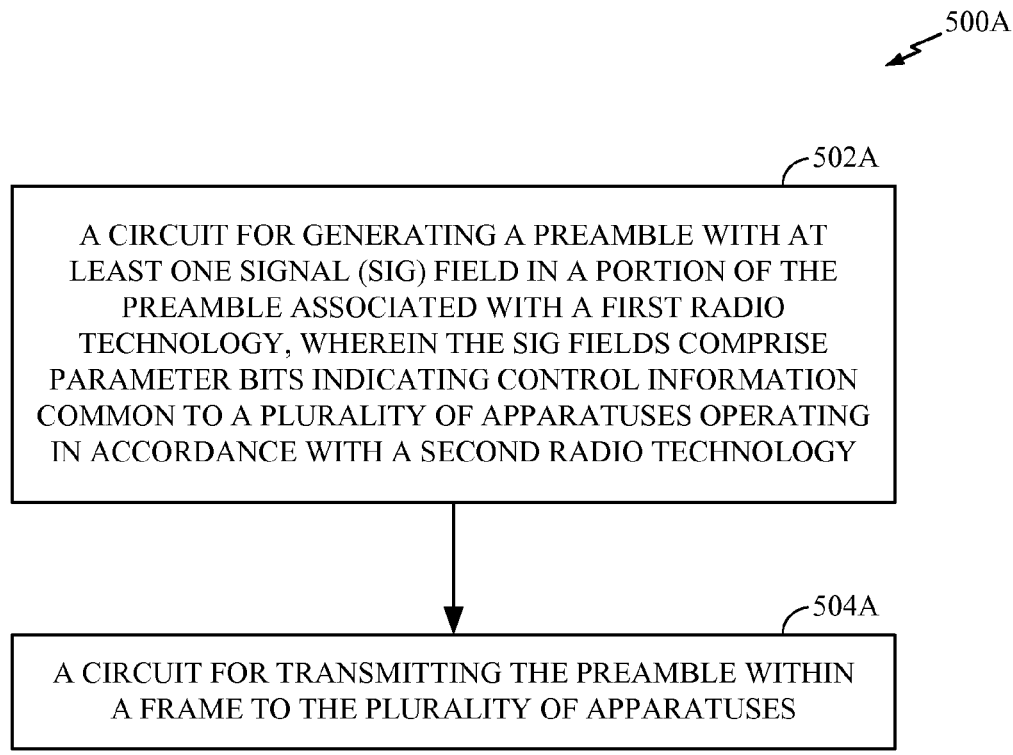
FIG. 5A illustrates example components capable of performing the operations shown in FIG. 5.
Figure 6A:
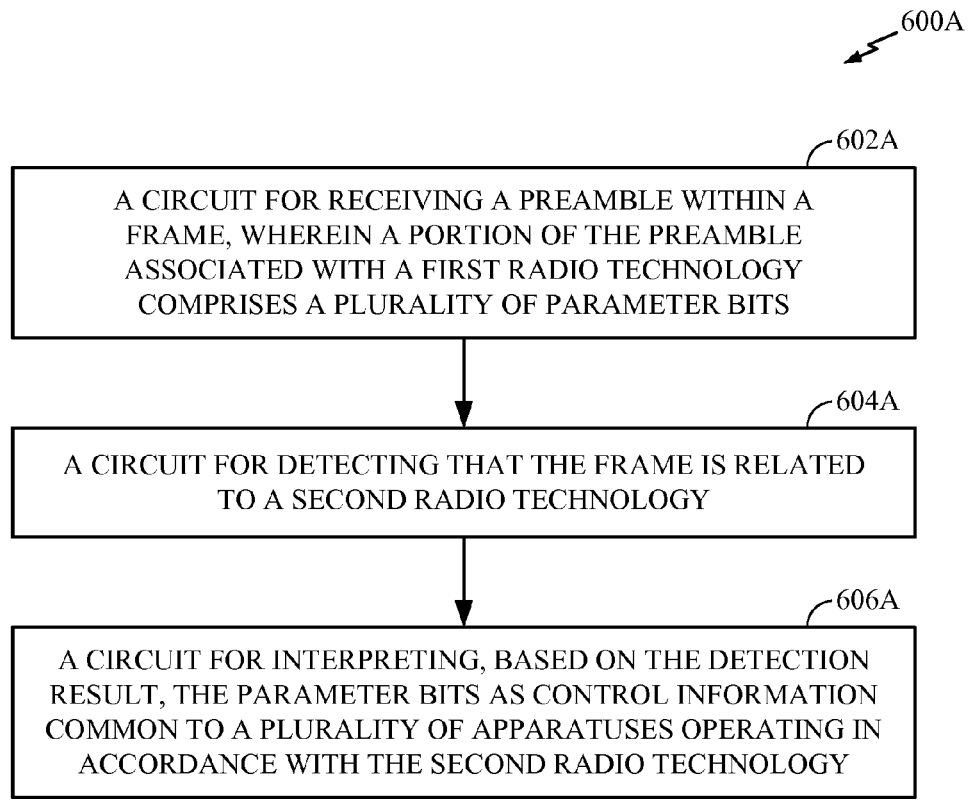
FIG. 6A illustrates example components capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500 and 600 illustrated in FIGS. 5 and 6 correspond to components 500A and 600A illustrated in FIGS. 5A and 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
generating a preamble with at least one signal (SIG) field in a portion of the preamble associated with a first radio access technology, wherein the SIG fields comprise parameter bits indicating control information common to a plurality of apparatuses operating in accordance with a second radio access technology;
utilizing an un-rotated BPSK code in one of the SIG fields to indicate a radio access technology associated with the frame; and
transmitting the preamble within a frame to the plurality of apparatuses.

2. The method of claim 1, wherein:
the first radio access technology comprises a technology based on IEEE 802.11n wireless communications standard, and
the second radio access technology comprises a technology based on IEEE 802.11ac wireless communications standard.

3. The method of claim 1, wherein the parameter bits comprise at least one of: combination of LENGTH and Modulation-Coding Scheme (MCS) bits, channel smoothing indication bit, sounding indication bit, aggregation bit, coding bit, short guard interval bit, space-time block coding (STBC) bit, or spatial stream (SS) bits.

4. An apparatus for wireless communications, comprising:
a circuit configured to generate a preamble with at least one signal (SIG) field in a portion of the preamble associated with a first radio access technology, wherein the SIG fields comprise parameter bits indicating control information common to a plurality of other apparatuses operating in accordance with a second radio access technology;
another circuit configured to utilize an un-rotated BPSK code in one of the SIG fields to indicate a radio access technology associated with the frame; and
a transmitter configured to transmit the preamble within a frame to the plurality of other apparatuses.

5. The apparatus of claim 4, wherein:
the first radio access technology comprises a technology based on IEEE 802.11n wireless communications standard, and
the second radio access technology comprises a technology based on IEEE 802.11ac wireless communications standard.

6. The apparatus of claim 4, wherein the parameter bits comprise at least one of: combination of LENGTH and Modulation-Coding Scheme (MCS) bits, channel smoothing indication bit, sounding indication bit, aggregation bit, coding bit, short guard interval bit, space-time block coding (STBC) bit, or spatial stream (SS) bits.

7. An apparatus for wireless communications, comprising:
means for generating a preamble with at least one signal (SIG) field in a portion of the preamble associated with a first radio access technology, wherein the SIG fields comprise parameter bits indicating control information common to a plurality of other apparatuses operating in accordance with a second radio access technology;
means for utilizing an un-rotated BPSK code in one of the SIG fields to indicate a radio access technology associated with the frame; and
means for transmitting the preamble within a frame to the plurality of other apparatuses.

8. The apparatus of claim 7, wherein:
the first radio access technology comprises a technology based on IEEE 802.11n wireless communications standard, and
the second radio access technology comprises a technology based on IEEE 802.11ac wireless communications standard.

9. The apparatus of claim 7, wherein the parameter bits comprise at least one of: combination of LENGTH and Modulation-Coding Scheme (MCS) bits, channel smoothing indication bit, sounding indication bit, aggregation bit, coding bit, short guard interval bit, space-time block coding (STBC) bit, or spatial stream (SS) bits.

10. A computer-program product for wireless communications, comprising a non-transitory a computer-readable medium comprising instructions executable to:
generate a preamble with at least one signal (SIG) field in a portion of the preamble associated with a first radio access technology, wherein the SIG fields comprise parameter bits indicating control information common to a plurality of apparatuses operating in accordance with a second radio access technology;
utilize an un-rotated BPSK code in one of the SIG fields to indicate a radio access technology associated with the frame; and
transmit the preamble within a frame to the plurality of apparatuses.

11. An access point, comprising:
at least one antenna;
a circuit configured to generate a preamble with at least one signal (SIG) field in a portion of the preamble associated with a first radio access technology, wherein the SIG fields comprise parameter bits indicating control information common to a plurality of wireless nodes operating in accordance with a second radio access technology
another circuit configured to utilize an un-rotated BPSK code in one of the SIG fields to indicate a radio access technology associated with the frame; and
a transmitter configured to transmit the preamble within a frame to the plurality of wireless nodes via the at least one antenna.

12. A method for wireless communications, comprising:
receiving a preamble within a frame, wherein a portion of the preamble associated with a first radio access technology comprises a plurality of parameter bits;
detecting that the frame is related to a second radio access technology;
detecting the transmission of the second radio access technology on an I-component of one of the SIG fields of the preamble; and
interpreting, based on the detection result, the parameter bits as control information common to a plurality of apparatuses operating in accordance with the second radio access technology.

13. The method of claim 12, wherein:
the first radio access technology comprises a technology based on IEEE 802.11n wireless communications standard, and
the second radio access technology comprises a technology based on IEEE 802.11ac wireless communications standard.

14. The method of claim 12, wherein the parameter bits comprise at least one of: combination of LENGTH and Modulation-Coding Scheme (MCS) bits, channel smoothing indication bit, sounding indication bit, aggregation bit, coding bit, short guard interval bit, space-time block coding (STBC) bit, or spatial stream (SS) bits.

15. The method of claim 12, wherein the I-component of one of the SIG fields of the preamble indicates an un-rotated BPSK code.

16. The method of claim 12, further comprising:
receiving another preamble within another frame, wherein a portion of the other preamble associated with the first radio access technology comprises another plurality of parameter bits;
detecting that the other frame is not related to the second radio access technology; and
interpreting the other plurality of parameter bits according to assumption that the other frame is related to the first radio access technology.

17. An apparatus for wireless communications, comprising:
a receiver configured to receive a preamble within a frame, wherein a portion of the preamble associated with a first radio access technology comprises a plurality of parameter bits;
a detector configured to detect that the frame is related to a second radio access technology and to detect the transmission of the second radio access technology on an I-component of one of the SIG fields of the preamble; and
a circuit configured to interpret, based on the detection result, the parameter bits as control information common to a plurality of apparatuses operating in accordance with the second radio access technology.

18. The apparatus of claim 17, wherein:
the first radio access technology comprises a technology based on IEEE 802.11n wireless communications standard, and
the second radio access technology comprises a technology based on IEEE 802.11ac wireless communications standard.

19. The apparatus of claim 17, wherein the parameter bits comprise at least one of: combination of LENGTH and Modulation-Coding Scheme (MCS) bits, channel smoothing indication bit, sounding indication bit, aggregation bit, coding bit, short guard interval bit, space-time block coding (STBC) bit, or spatial stream (SS) bits.

20. The apparatus of claim 17, wherein the I-component of one of the SIG fields of the preamble indicates an un-rotated BPSK code.

21. The apparatus of claim 17, wherein:
the receiver is also configured to receive another preamble within another frame, wherein a portion of the other preamble associated with the first radio access technology comprises another plurality of parameter bits;
the detector is also configured to detect that the other frame is not related to the second radio access technology; and
the circuit is also configured to interpret the other plurality of parameter bits according to assumption that the other frame is related to the first radio access technology.

22. An apparatus for wireless communications, comprising:
means for receiving a preamble within a frame, wherein a portion of the preamble associated with a first radio access technology comprises a plurality of parameter bits;
means for detecting that the frame is related to a second radio access technology;
means for detecting the transmission of the second radio access technology on an I-component of one of the SIG fields of the preamble; and
means for interpreting, based on the detection result, the parameter bits as control information common to a plurality of apparatuses operating in accordance with the second radio access technology.

23. The apparatus of claim 22, wherein:
the first radio access technology comprises a technology based on IEEE 802.11n wireless communications standard, and
the second radio access technology comprises a technology based on IEEE 802.11ac wireless communications standard.

24. The apparatus of claim 22, wherein the parameter bits comprise at least one of: combination of LENGTH and Modulation-Coding Scheme (MCS) bits, channel smoothing indication bit, sounding indication bit, aggregation bit, coding bit, short guard interval bit, space-time block coding (STBC) bit, or spatial stream (SS) bits.

25. The apparatus of claim 22, wherein the I-component of one of the SIG fields of the preamble indicates an un-rotated BPSK code.

26. The apparatus of claim 22, further comprising:
means for receiving another preamble within another frame, wherein a portion of the other preamble associated with the first radio access technology comprises another plurality of parameter bits;
means for detecting that the other frame is not related to the second radio access technology; and
means for interpreting the other plurality of parameter bits according to assumption that the other frame is related to the first radio access technology.

27. A computer-program product for wireless communications, comprising a non-transitory a computer-readable medium comprising instructions executable to:
receive a preamble within a frame, wherein a portion of the preamble associated with a first radio access technology comprises a plurality of parameter bits;
detect that the frame is related to a second radio access technology;
detect the transmission of the second radio access technology on an I-component of one of the SIG fields of the preamble; and
interpret, based on the detection result, the parameter bits as control information common to a plurality of apparatuses operating in accordance with the second radio access technology.

28. An access terminal, comprising:
at least one antenna;
a receiver configured to receive a preamble within a frame via the at least one antenna, wherein a portion of the preamble associated with a first radio access technology comprises a plurality of parameter bits;
a detector configured to detect that the frame is related to a second radio access technology and to detect the transmission of the second radio access technology on an I-component of one of the SIG fields of the preamble; and
a circuit configured to interpret, based on the detection result, the parameter bits as control information common to a plurality of access terminals operating in accordance with the second radio access technology.

* * * * *